United States Patent [19]
Hirai et al.

[11] Patent Number: 4,513,311
[45] Date of Patent: Apr. 23, 1985

[54] VIDEO SIGNAL PROCESSING UNIT

[75] Inventors: Jun Hirai, Tokyo; Masayasu Kaneko, Yokohama, both of Japan

[73] Assignee: Sony Corporation, Tokyo, Japan

[21] Appl. No.: 363,531

[22] Filed: Mar. 30, 1982

[30] Foreign Application Priority Data

Mar. 30, 1981 [JP] Japan .................................. 56-46749

[51] Int. Cl.³ ........................................... H04N 9/491
[52] U.S. Cl. ..................................... 358/40; 358/31; 358/329
[58] Field of Search ...................... 358/31, 36, 40, 329

[56] References Cited

FOREIGN PATENT DOCUMENTS 60186 5/1981 Japan ..................................... 358/31

*Primary Examiner*—Tommy P. Chin
*Attorney, Agent, or Firm*—Lewis H. Eslinger; Alvin Sinderbrand

[57] ABSTRACT

A processing circuit for a composite color television signal formed of a chrominance component and a luminance component includes a comb filter of the type including a 1H delay line. In order to process the chrominance component, the comb filter is followed by an operational circuit providing a difference signal representing vertical correlation of the input chrominance component for consecutive line intervals, and a feedback loop circuit for combining the input chrominance component with the feedback difference signal before application to the comb filter. A detecting circuit detects correlation of video information in the luminance component in vertically aligned portions of successive horizontal line intervals, and provides a detecting signal which is used to adjust the feedback loop gain on the feedback loop circuit in accordance with the detecting signal. The processing circuit can further comprise a luminance comb filter including the delay line and an additive combining circuit, which is followed by a subtractive combining circuit and a band pass filter having an input connected to an output of the subtractive combining circuit and an output connected to an input of the latter. This circuit gives the luminance comb filter a flat frequency transfer characteristic. In the detecting circuit, a delay circuit is provided formed of a pre-emphasis circuit, an AM modulator, a delay line, an AGC circuit, an AM detector, a de-emphasis circuit, and a low pass filter.

22 Claims, 18 Drawing Figures

VIDEO SIGNAL PROCESSING UNIT

BACKGROUND OF THE INVENTION

1. Field of the Invention

This invention relates to video signal processing circuitry for processing a composite color video signal, and is more particularly directed to a comb filter circuit suitable for processing a color video signal reproduced by means of a video tape recorder/player or VTR.

2. Description of the Prior Art

Comb filters are commonly used for processing the luminance and chrominance components of a composite color video signal reproduced from magnetic tape or other recording medium in order to eliminate undesired signals, such as so-called crosstalk. Because of its serrated characteristic, a comb filter also aids in separation of frequency-interleaved signals, and thus can be used to eliminate remnants of chrominance components from the reproduced luminance component and to eliminate remnants of the luminance component from the reproduced chrominance component.

Generally, there are two types of comb filter circuits commonly used in a VTR: a chrominance, or C-type comb filter for processing the reproduced chrominance component; and a luminance, or Y-type comb filter for processing the reproduced luminance component.

A conventional C-type comb filter is an open-loop circuit formed of a delay line with a one-horizontal-line-period delay time and a subtractive combining circuit for combining the delayed and undelayed chrominance component. Because the phase of the chrominance subcarrier signal alternates from one line to the next, the delayed and undelayed chrominance components combine constructively in the subtractive combining circuit.

The comb filter, being an open loop circuit, has a wide pass band characteristic in the vicinity of the frequency of the chrominance subcarrier. Consequently, the blocking characteristic for the luminance component is rather narrow, and undesired remnants of the luminance component are permitted to pass therethrough. For this reason the signal to noise ratio (SNR) for the chrominance component remains rather low even after processing the same through the C-type comb filter.

To combat this problem it has been previously proposed to incorporate into a C-type comb filter a feedback circuit to improve the SNR. This can comprise an additive combining circuit for combining the delayed and undelayed chrominance components, and an attenuator for feeding back the combined resulting signal from the additive combining circuit to a point in advance of the comb filter. Then a subtractive combining filter combines the attenuated feedback signal with the input chrominance signal to reduce or eliminate the undesired remnants of the luminance signal from the processed chrominance signal.

This previously proposed circuit works well only so long as there is strong vertical correlation in the luminance component of the video signal, that is, only when video information in one horizontal line interval has substantially the same value as corresponding video information in an adjacent horizontal line interval. Accordingly, the previously-proposed circuit also includes a correlation detecting circuit for detecting whether there is good vertical correlation in the luminance component and a switch connected to the attenuator for cutting the feedback signal in or out in response to the output of the detecting circuit.

However, because there is no feedback signal provided at times when a lack of vertical correlation is detected, the comb filter still has a rather low SNR at such times.

The circuit for detecting vertical correlation generally includes a delay line having a one-line-interval delay time, a subtractive combining circuit provided with the luminance component and a one-line-interval delayed version thereof, and a comparator for comprising a difference output from the subtractive combining circuit with a threshold reference level. When the subtractive output is below the reference level, high vertical correlation is indicated, and a signal is provided to cut the feedback circuit in. When the subtraction output is higher than the reference level, low vertical correlation is indicated, and the feedback circuit is cut out.

Unfortunately, a conventional delay line is used in the above circuit for detecting vertical correlation. Such delay lines have a good pass band only for frequencies in the vicinity of the chrominance subcarrier frequency. Consequently, the delayed and undelayed versions of the luminance signal that are applied to the subtractive combining circuit have substantially different characteristics. As a result, the signal provided by the correlation detecting circuit will not accurately reflect true vertical correlation in the luminance component.

A conventional Y-type comb filter is also an open-loop circuit and is generally formed of a delay line with a one-horizontal-line-period delay time and an additive combining circuit for combining the delayed and undelayed luminance component. As mentioned previously, the delay line has a band pass characteristic centered at the frequency of the chrominance subcarrier. Consequently, the the Y-type comb filter has a higher gain in the vicinity of the chrominance subcarrier than at other frequencies in the band of the luminance component. This can cause distortion and ringing in the video signal.

It has been proposed to provide a low pass filter following the Y-type comb filter. However, such a filter cancels out many desired high-frequency portions of the luminance component. Thus, conventional techniques have failed to provide a Y-type filter having a flat output characteristic.

OBJECTS AND SUMMARY OF THE INVENTION

Accordingly, an object of this invention is to provide a signal processing circuit for a composite color video signal that avoids the problems inherent in conventional such circuits.

It is another object of the invention to provide a signal processing circuit in which the chrominance component of the composite color video signal is provided generally free of unwanted crosstalk signals and is provided with a high signal-to-noise ratio, and in which color misregistration and blur are avoided in the reproduced picture.

It is a further object of this invention to provide a luminance signal processing circuit including a luminance comb filter circuit and having a generally flat output characteristic.

According to an aspect of this invention, a processing circuit processes a composite color video signal containing a luminance component and a chrominance component, with the composite color video signal being formatted as a sequence of horizontal line intervals each having a predetermined horizontal line period and each containing video information to be presented in vertical alignment with corresponding video information in an adjacent line interval. In the processing circuit, a chrominance comb filter receives an input chrominance component signal and provides a filtered chrominance component in which undesired signal components have been suppressed. An operational circuit provides a difference signal representing the vertical correlation of the input chrominance component signal in aligned portions of different horizontal line intervals. A feedback loop circuit, including at least one attenuator to determine the feedback loop gain thereof, is provided to feed the difference signal back to a point in advance of the chrominance comb filter and combine such signal with the input chrominance component signal. A detecting circuit detects vertical correlation of video information in the luminance component and provides a detecting signal having one sense when there is good vertical correlation and another sense when there is not. Finally, a controlling circuit adjusts the feedback loop gain in accordance with the sense of the detecting signal.

According to a further aspect of the invention, a luminance comb filter receives the luminance component and provides a filtered luminance component at an output thereof, and, following the latter, a subtractive combining circuit having an input connected to said output, and a band pass filter connected between an output of the subtractive combining circuit and another input thereof. Where the comb filter includes a delay line having a frequency passband characteristic centered about the frequency of the chrominance subcarrier, the band pass filter is selected to have its passband correspondingly centered about that frequency.

According to still another aspect of this invention, the detecting circuit includes a delay circuit and a subtractive combining circuit for subtractively combining the luminance component with a version thereof delayed by one line period. Because a conventional delay line passes the frequencies of the chrominance component more easily than those of the remainder of the luminance component, an improved delay circuit is provided. Such improved circuit includes an amplitude modulator for modulating a carrier with the luminance component, a delay line following the modulator, and an AM detector following the delay line. Additionally, preemphasis and deemphasis circuits can be provided before the modulator and after the detector, respectively, and an automatic gain control circuit can be provided between the delay line and the detector.

Many other objects, features, and advantages of this invention will become apparent from the ensuing description which is to be considered in connection with the accompanying drawings.

DETAILED DESCRIPTION OF THE PREFERRED EMBODIMENTS

Figure 1:
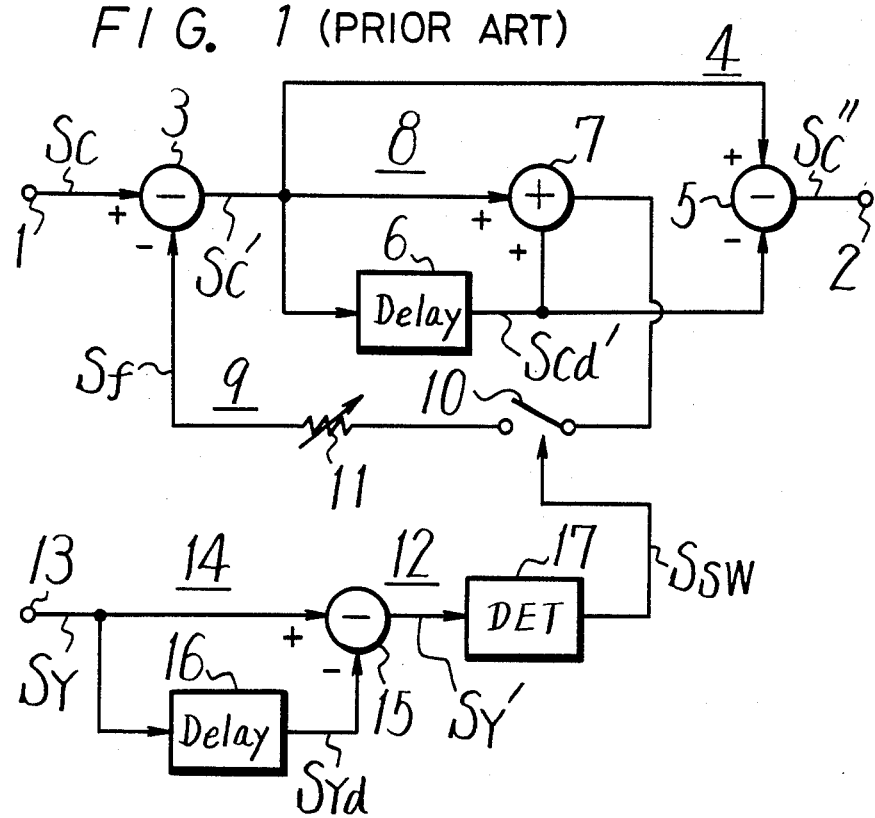
FIG. 1 is a block diagram of a prior-art processing circuit for a chrominance component of a composite color video signal.

In order to better understand the background of this invention and to more fully appreciate its advantages, a previously-proposed processing circuit will be described with reference to FIG. 1. In that processing circuit an input terminal 1 receives an input chrominance component signal $S_c$, for example, from a video tape player or VTR, and an output terminal 2 provides a processed chrominance component signal $S_c''$. The input signal $S_c$ is provided to a composer or subtractive combining circuit 3 and an output thereof provides an intermediate chrominance component signal $S_c'$. The latter signal is applied to a C-type comb filter 4 here formed of a composer or subtractive combining circuit 5 and a delay line 6 having a delay time of 1H, i.e., one horizontal line period. The intermediate signal $S_c'$ is applied to one input (+) of the subtractive combining circuit 5 and a delayed version $S_{cd}'$ thereof is applied from the delay line 6 to another input terminal (−) thereof. The subtractive combining circuit 5 has an output providing the processed chrominance signal $S_c''$ to the output terminal 2.

Another composer, or additive combining circuit 7 has inputs connected respectively to the output of the combining circuit 3 and to the delay line 6, which jointly form an operational circuit 8 to provide a difference signal representing the vertical correlation between the chrominance component signals $S_c$ in two successive line intervals. Because of the phase inversion of the chrominance signal from one line to the next, in this circuit, the forming of a chrominance difference signal is carried out by adding the delayed and undelayed versions of the intermediate chrominance component signal $S_c'$.

This difference signal is applied to an input of the subtractive combining circuit 3 as a feedback signal $S_f$. For this reason a feedback circuit 9 formed of a switching circuit 10 and a variable attenuator 11 is connected between the output of the combining circuit 7 and an input of the combining circuit 3.

The delay line 6 could alternatively have a delay time of a plurality of line periods.

A detecting circuit 12 detects vertical correlation of the luminance component associated with the chrominance component being processed, and which is applied to an input 13 thereof. This detecting circuit 12 generally includes a luminance-type comb filter 14 formed of a composer or subtracting circuit 15 and a delay line 16 having a delay time of 1H, i.e., one horizontal line period. A luminance component signal $S_y$ applied to the subtracting circuit 15 is also applied to the delay line 16, and the latter provides a delayed luminance component $S_{yd}$ which is delayed behind the luminance component signal by one horizontal line period. This delayed luminance component $S_{yd}$ is subtractively combined with the luminance component signal $S_y$ and a luminance difference signal $S_y'$ ($=S_y-S_{yd}'$) is furnished from the subtracting circuit 15 to a detector 17.

The latter provides a switching signal $S_{SW}$ which is high when the absolute value of the difference signal $S_y'$ is below a particular reference level, but is low otherwise. The delay time of the delay line 16 can be any positive integer times one line period, but should be the same as the delay time of the delay line 6.

If the absolute value of the signal $S_y'$ is below the reference level, the luminance signal $S_y$ is regarded as having high vertical correlation. Accordingly, the switching signal $S_{SW}$ acts to close the switching circuit 10, to complete the feedback circuit 9. However, when the absolute value of the signal $S_y'$ exceeds the reference level, the luminance signal $S_y$ is regarded as having no vertical correlation. Thus, the switching circuit 10 is opened and the feedback circuit 9 is cut out.

The operating characteristics of the prior art circuit of FIG. 1 can be explained as follows:

First, the relation among the input chrominance component signal $S_c$, the intermediate chrominance component signal $S_c'$, and the processed chrominance component signal $S_c''$ will be considered.

If it is assumed that the transfer function of the 1H delay line 6 is expressed as $e^{-\tau s}$, that of the switching circuit 10 as k, and the attenuation factor of the attenuator 11 as l, the following equations (1) and (2) result:

$$S_c' = S_c - k\, l(S_c' + S_c' \cdot e^{-\tau s}) \quad (1)$$

$$S_c'' = S_c' - S_c' \cdot e^{-s} \quad (2)$$

Therefore, the $S_c''/S_c$ of the processing circuit, as a whole, for the chrominance component can be expressed as follows:

$$\frac{S_c''}{S_c} = \frac{1 - e^{-\tau s}}{1 + kl(1 + e^{-\tau s})} \quad (3)$$

When the luminance signal $S_y$ has no vertical correlation, k=0. Therefore, the above equation (3) can be expressed as follows:

$$\frac{S_c''}{S_c} = 1 - e^{-\tau s} \quad (4)$$

Figure 2:
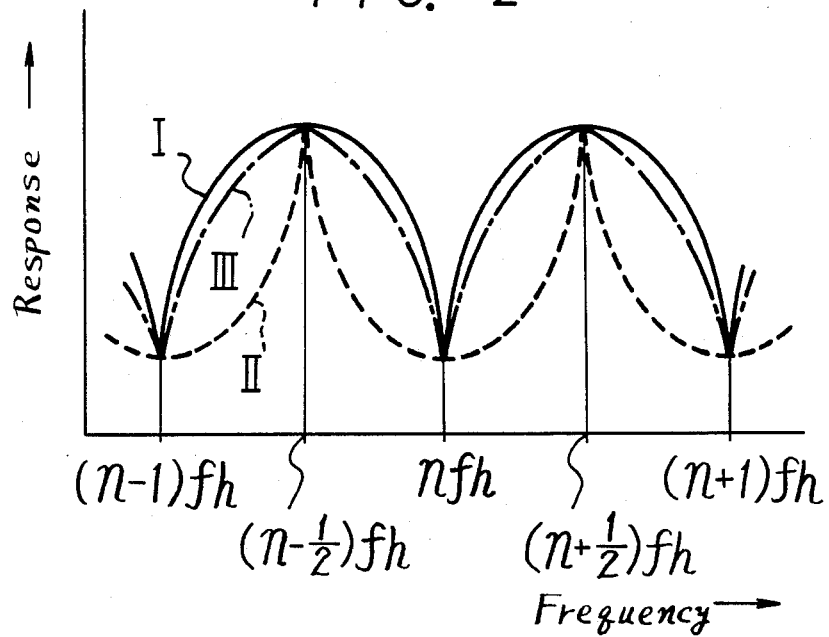
FIG. 2 is a graph showing frequency characteristics of comb filters.

Thus, the equation (4) represents a frequency characteristic denoted by a curve I (solid line) in FIG. 2, which is the serrated, or comb-shaped filter characteristic of an ordinary C-type comb filter.

When the luminance signal has substantial vertical correlation, then k=1, so that the equation (3) becomes:

$$\frac{S_c''}{S_c} = \frac{1 - e^{-\tau s}}{1 + (1 - e^{-\tau s})} \quad (5)$$

The equation (5) corresponds to the frequency characteristic represented by a curve II (dotted line) in FIG. 2, which is the characteristic of a conventional feedback C-type filter.

Accordingly, in response to detection of vertical correlation of the luminance signal, the transfer function is changed. That is, when there is a lack of vertical correlation, the C-type filter characteristic represented by the curve I in FIG. 2 is present, but when there is substantial vertical correlation, and the chrominance component $S_c$ is concentrated near a frequency $(n+\frac{1}{2})f_h$, where n is a natural number (1,2,3, . . . ) and $f_h$ is the horizontal line repetition frequency, the feedback C-type comb filter characteristic, as represented by the curve II, is present, and the SNR of the chrominance component signal $S_c''$ is greatly improved. Furthermore, in addition to achieving an improved SNR, such phenomena as color misprint or misregistration, and color blur can be effectively avoided in the reproduced color picture.

With the processing circuit of FIG. 1, while the above-described signal improvements are effectively carried out, the switching circuit 10 is opened when no vertical correlation exists in the luminance signal. Consequently, there is an increase in cross-talk components when a lack of vertical correlation is detected. This can be explained with reference to FIGS. 3A to 3F.

Figure 3:
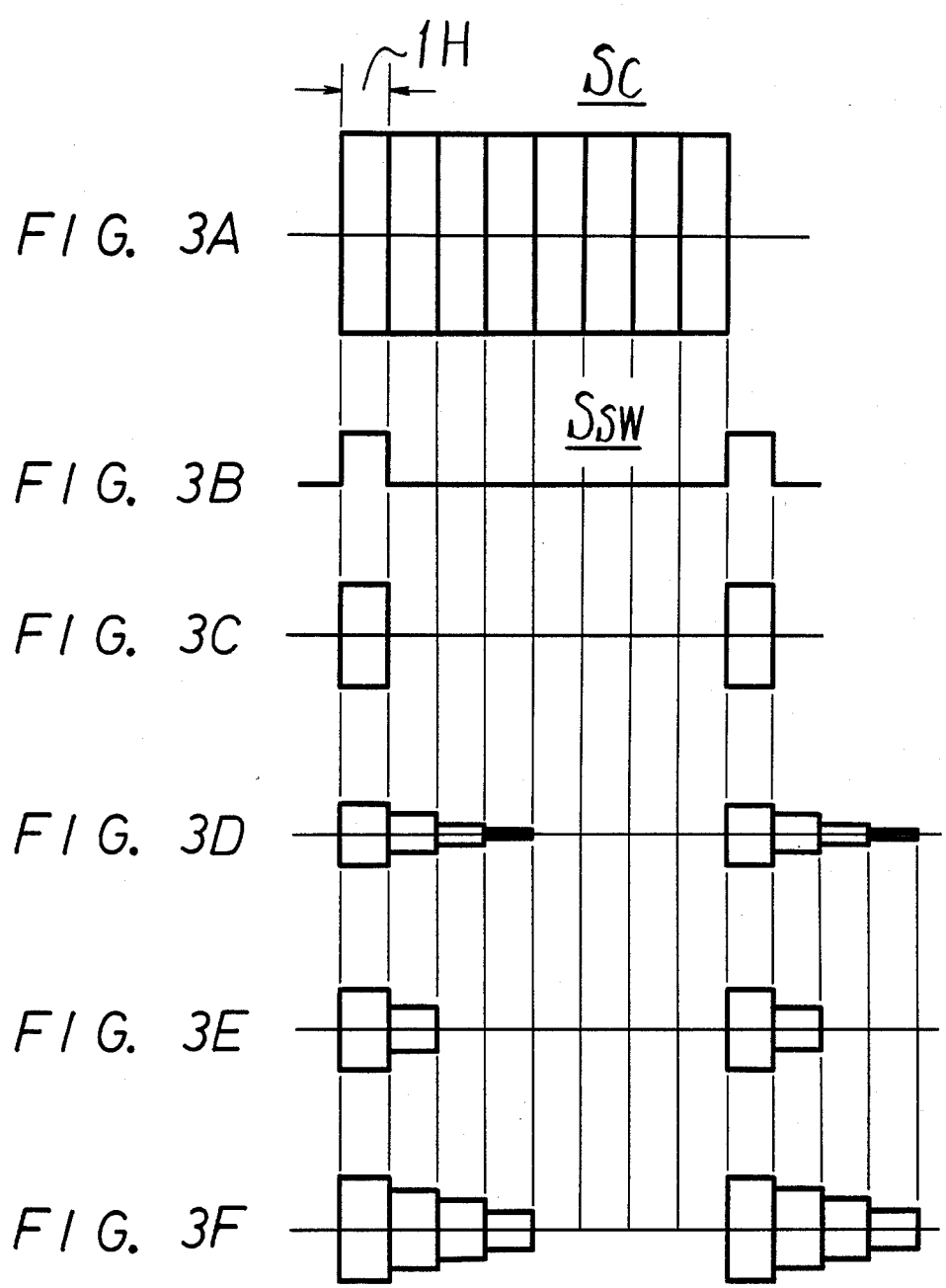
FIGS. 3A to 3F are waveform diagrams used to explain the operation of the circuit shown in FIG. 1.

FIG. 3A shows the waveform of the input chrominance component signal $S_c$ applied to the input terminal 1, and FIG. 3B shows the waveform of the control signal or detecting signal $S_{SW}$ provided from the detector 17. Here the detecting signal $S_{SW}$ is high for one line interval period where the luminance component $S_y$ has no vertical correlation, and is low at other times where there is substantial vertical correlation in the luminance component $S_y$.

First, the behavior of chrominance cross-talk will be considered for the case in which the switching circuit 10 is held open. In this case, as shown in FIG. 3C, cross-talk components in the output chrominance component signal $S_c''$ behave as large amplitude pulses with the same timing as the detecting signal $S_{SW}$ of FIG. 3B.

Next, the behavior of the chrominance component and cross-talk components will be considered for the case in which the switching circuit 10 is held closed. In this case, as shown in FIG. 3D, since the strength of the feedback signal $S_f$ becomes large when the luminance signal lacks vertical correlation, the level of the cross-talk components in the output chrominance component signal $S_c''$ is low, but the output chrominance component signal $S_c''$ lacks sharpness, and color misprint, misregistration, and blur can appear in the reproduced color picture.

In normal operation, as shown in FIG. 3F where the switching circuit 10 is opened and closed in accordance with the switching signal $S_{SW}$ of FIG. 3A, dulling of the waveform of the output chrominance component signal $S_c''$ is avoided, as are the concomitant color misprit, misregistration, and blur. However, the level of the cross talk components becomes objectionably high.

Ideal operation is illustrated in FIG. 3E, but this is not achievable with the conventional circuitry of FIG. 1.

Figure 4:
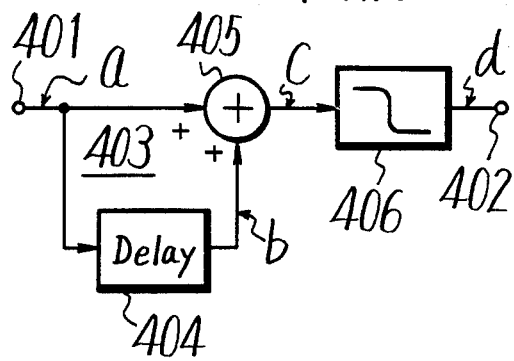
FIG. 4 is a block diagram of a prior-art luminance comb filter circuit.

A conventional Y-type, or luminance comb filter circuit is illustrated in FIG. 4. This comb filter circuit is useful in separating the luminance component from the chrominance component of a composite color video signal.

The processing circuit of FIG. 4 has an input terminal 401 to which an input signal a containing the luminance component $S_y$ is applied, and an output terminal 402 at which the filtered luminance component $S_y'$ appears. This circuit is comprised basically of a Y-type comb filter 403 including a 1H delay line 404 having an input coupled to the input terminal 401 and an output coupled to one input of an addititive combining circuit 405. Another input of the latter is coupled to the input terminal 401. Thus, the signal a is combined with a delayed version b thereof and a sum signal c is provided. A low-pass filter 406 can be disposed following the combining circuit 405 to provide a filtered output signal d. The delay line 404 is preferably a glass delay line, which, as aforesaid, has a bandpass frequency characteristic centered about the frequency $f_c$ of the chrominance component signal $S_c$. Although the delay line 404 of the illustrated circuit has a delay time of one line, the delay time could alternatively be an integral multiple thereof.

Figure 5A:
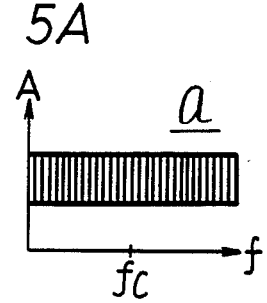
FIGS. 5A to 5D' are waveform diagrams used to explain the operation of the circuit shown in FIG. 4 and that shown in FIG. 7.
Figure 5B:
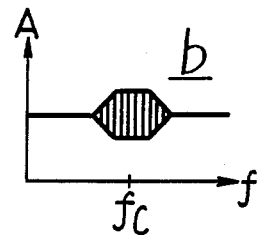

The frequency characteristic of the circuit of FIG. 4 can be explained with reference to FIGS. 5A to 5D. If the video signal a that is applied to the input terminal 401 has a constant amplitude A for all frequencies f of the video signal, as shown in FIG. 5A, the delayed signal b provided at the output of the delay line 404 will exhibit a bandpass characteristic centered about the chrominance subcarrier frequency $f_c$, as shown in FIG. 5B. In the NTSC system, this frequency $f_c$ is 3.58 MHz, and the bandpass characteristic of the delay line 404 extends from about 3.08 MHz to about 4.08 MHz. Accordingly, the luminance signal $S_y$, which is the sum signal c appearing at the output of the combining circuit 405, exhibits bulge-like frequency characteristic shown in FIG. 5C. That is, in the luminance component signal $S_y$ the amplitude A is about 6 dB higher in the range 3.58 MHz±0.5 MHz than in remainder of the frequency range thereof. Consequently, if the signal c is used as the luminance signal, substantial distortion is generated and ringing will occur.

To avoid such distortion and ringing, the low pass filter 406 is conventionally provided with a roll off frequency at about the chrominance subcarrier frequency $f_c$. Thus, the filter luminance signal d is provided as shown in FIG. 5D. However, as shown illustrating therein, the filter 406 does not provide a flat signal and, indeed, cuts off much of the higher-frequency portion of the luminance signal $S_y$. Consequently, the sharpness of the luminance signal $S_y$ is substantially reduced.

Ideally, the luminance signal $S_y$ should be provided with a substantially flat frequency spectrum, for example, as shown with the signal d' in FIG. 5D'. However, this ideal signal d' is not achievable with the circuit of FIG. 4.

Embodiments of the present invention, which overcome the aforementioned problems, are illustrated in FIGS. 6–9.

A first embodiment of the processing circuit of this invention for processing the chrominance component $S_c$ of a composite color video signal will be described with reference to FIG. 6. Elements in this embodiment which are also common to the processing circuit shown in FIG. 1 are identified with the same reference characters, and a detailed description of such elements will be omitted.

Figure 6:
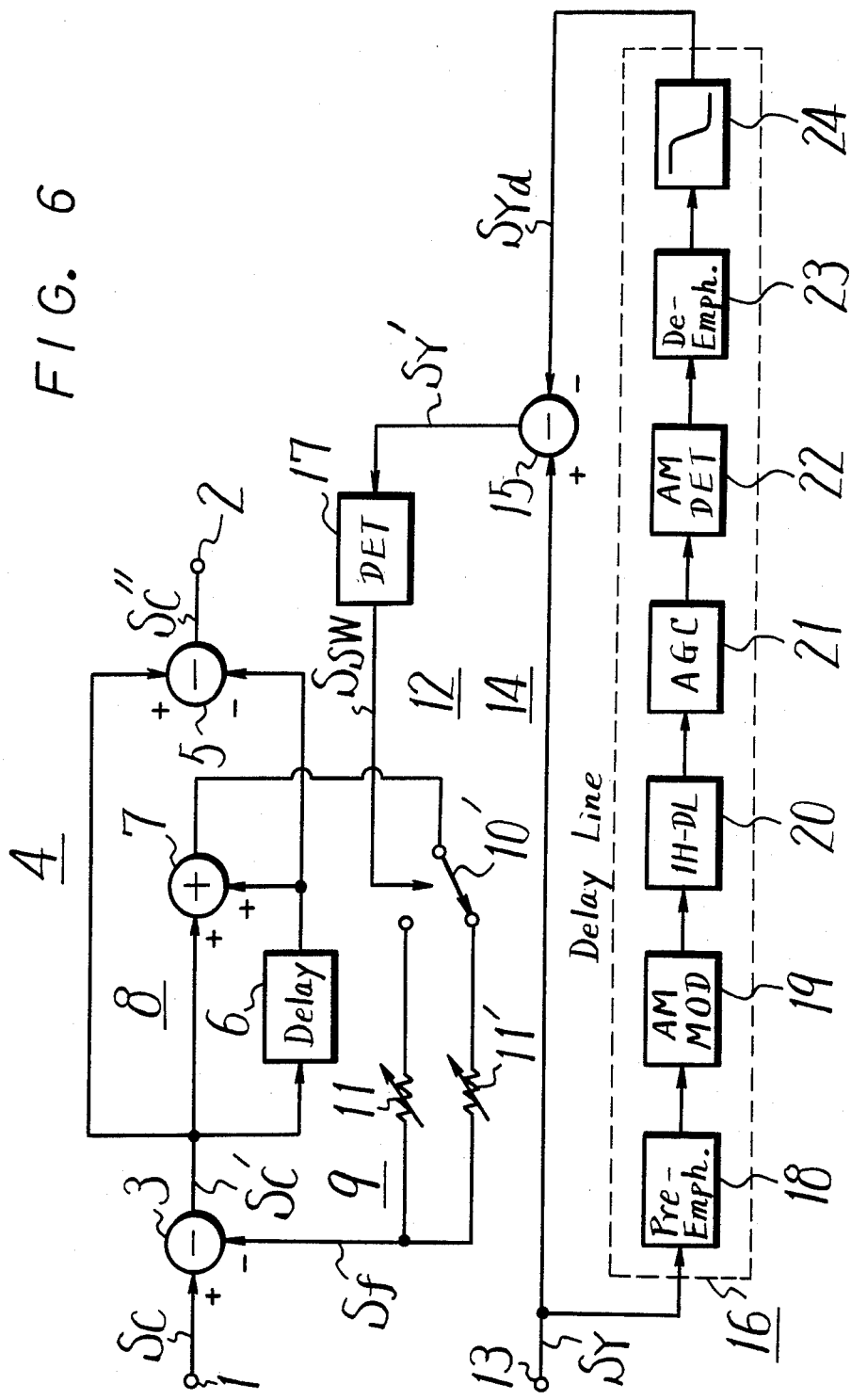
FIG. 6 is a block diagram of an embodiment of a chrominance component processing circuit according to the present invention.

The processing circuit of FIG. 6 includes the feedback-type comb filter 4 together with the operational circuit 8 which produces a difference signal to be applied as a feedback signal $S_f$ to the subtracting circuit 3 in advance of the comb filter 4.

Also, similarly to the processing circuit of FIG. 1, the circuit of this embodiment includes the detecting circuit 12 in which the luminance component signal $S_y$ is supplied directly to one input of the combining circuit 15 and is also supplied through the delay circuit 16 to another input of the combining circuit 15, so that the latter provides a difference signal $S_y'$ to the detecting circuit 17. The latter then provides the switching signal $S_{SW}$ having one sense when vertical correlation is detected in the luminance component signal $S_y$ and another complementary sense when vertical correlation is determined to be absent therefrom.

In the feedback circuit 9 of this embodiment, a second variable attenuator 11' is provided in addition to the attenuator 11, and a change-over switching circuit 10', i.e., a single-pole-double-throw switch, selectively connects one or the other of these attenuators 11 and 11' to the output of the combining circuit 7 in response to the switching signal $S_{SW}$. In this embodiment, the attenuator 11' has an amount of attenuation l' which is larger than that l of the other attenuator 11. The change-over switching circuit 10' is actuated by the detecting signal $S_{SW}$ such that when there is substantial vertical correlation, the change-over switching circuit 10' connects the attenuator 11 in circuit, but when there is an absence of vertical correlation, the change-over switching circuit 10' connects the attenuator 11' to reduce the strength of the feedback signal $S_f$ as compared to that when the attenuator 11 is connected in circuit.

In addition to the above difference, the delay circuit 16 used in the detecting circuit 12 of this embodiment is especially adapted to compensate for the relatively poor transfer characteristics of a glass delay line for most frequencies of the luminance component signal $S_y$. If the delay circuit 16 consisted only of a glass delay line, the band pass characteristic would be unsuitable for passing the entire band of the luminance component signal $S_y$. Thus, the delay circuit 16 is constructed as illustrated in FIG. 6 to have a substantially flat transfer characteristic. More specifically, the delay circuit 16 includes a preemphasis circuit 18 for imparting a degree of preemphasis to the input luminance component $S_y$. An AM modulator 19 following the preemphasis circuit 18 modulates a selected carrier with the preemphasized luminance component. In this embodiment, the carrier frequency is selected at 10.74 MHz, i.e., the third harmonic of the chrominance subcarrier frequency $f_c$. A delay line 20, following the modulator 19, imparts a delay of one horizontal line to the modulated signal. In this embodiment, the delay line is a glass delay line. Alternatively, the delay line could have a delay time of an integral multiple of one horizontal line. An automatic gain control circuit 21 following the delay line 20 controls the amplitude of the delayed modulated signal. Then, an AM detector 22, in this embodiment a full-wave rectifier, detects the delayed luminance component signal $S_{yd}$. Therefore, a deemphasis circuit 23 provides an amount of deemphasis complementary to the preemphasis provided by the preemphasis circuit 18. Finally, the deemphasized delayed luminance component signal $S_{yd}$ is fed through a low-pass filter 24 to the substractive combining circuit 15. Here, all of the elements of the delay circuit 16, with the exception only of the delay 20 and the low-pass filter 24, can be provided on a single integrated circuit chip. Further, the upper frequencies detected by the AM detector 22, corresponding to those frequencies at twice the carrier frequency 10.74 MHz, are substantially suppressed by the deemphasis circuit 23, thereby reducing the amount of attenuation required to be provided by the low-pass filter 24.

The operation of the video signal processing circuit of this embodiment will now be explained.

When the switching circuit 10' is changed over to connect the attenuator 11 in circuit, the transfer function $S_c''/S_c$ is as expressed by the above equation (5) and its frequency characteristic is as represented by the curve II in the graph of FIG. 2. However, when the switching circuit 10' is changed over to connect the attenuator 11' in circuit, the transfer function $S_c''/S_c$ is expressed by the following equation (5') where l' is the transfer function of the attenuator 11' (l'>1):

$$\frac{S_c''}{S_c'} = \frac{1 - e^{-\tau s}}{1 + l'(1 - e^{-\tau s})} \quad (5')$$

The frequency characteristic thereof is represented by chain-line curve III in the graph of FIG. 2.

That is, the transfer function of the embodiment of FIG. 6 is varied in response to detection of vertical correlation of the luminance signal or the lack thereof. Thus, when vertical correlation is lacking, the filter characteristic shown by the curve III in FIG. 2 applies, but where there is substantial vertical correlation, the filter characteristic represented by the curve II applies. In this embodiment, the attenuation factors l and l' are selected so that the characteristic of curve III is midway between those of curves I and II.

With the embodiment of FIG. 6, since the feedback circuit 9 provides a finite feedback signal $S_f$ even though no vertical correlation exists in the luminance signal, any cross-talk components in the output chrominance component signal $S_c''$, as shown in FIG. 3E, are substantially reduced with respect to cross-talk components of the circuit of FIG. 1. In addition, when there is no vertical correlation in the luminance signal $S_y$, the strength of the feedback signal $S_f$ is substantially less than that when substantial vertical correlation is present, so that dulling of the waveform of the output chrominance component signal $S_c''$ is reduced. This reduces color misprint or misregistration, and also reduces color blur in the reproduced color video picture. In addition, the signal-to-noise ratio of the output chrominance component signal $S_c''$ is greatly improved over that for the circuit in which the feedback loop gain is constant.

Further, the embodiment of FIG. 6, can be arranged such that the attenuator 11' is connected in circuit during a chrominance burst signal, or, alternatively, such that the switch 10' is opened, if that is desired, during the period of the burst signal. In this way any phase fluctuation in the chrominance burst signal can be avoided. Thus, the amount of feedback attenuation brought about by the attenuator 11, and provided when vertical correlation exists, can be increased.

With a color video signal processing circuit according to this invention, the output chrominance component signal $S_c''$ is provided without substantial undesired noise therein, but with a sharp chrominance waveform and a high signal-to-noise ratio.

Now an embodiment of an improved Y-type or luminance comb filter circuit, for example, for use in a luminance component separating circuit, will be described with reference to FIG. 7, which is found on the same sheet as FIG. 4. Elements of the embodiment of FIG. 7 which are common to the circuit of FIG. 4 are identified with the same reference characters, and a detailed description thereof is omitted.

Figure 5C:
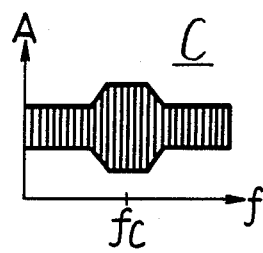
Figure 5D:
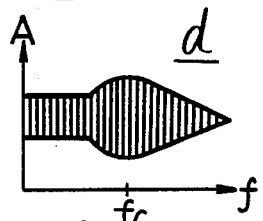
Figure 5D:
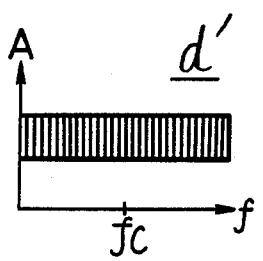

The circuit of this invention comprises the Y-type comb filter 403 which is supplied with color video signal a (FIG. 5A) and which provides the luminance component output signal c (FIG. 5C). However, in this embodiment, the low-pass filter 406 is replaced by a subtractive combining circuit 407 having an input coupled to receive the signal c and an output coupled to the output terminal 402, and a bandpass filter 408 with an input connected to the output of the combining circuit 407 and an output connected to another input terminal of the latter. Because the delay line 404 has substantially a band-pass characteristic as shown in FIG. 5B, the band-pass filter 408 is selected to have substantially the same band-pass frequency characteristic. Thus, the band-pass filter 408 provides a signal corresponding substantially to the signal b (FIG. 5B) to be subtracted from the luminance signal c (FIG. 5C). Consequently, an ideal output signal d' (FIG. 5D') appears at the output terminal 402.

Figure 7:
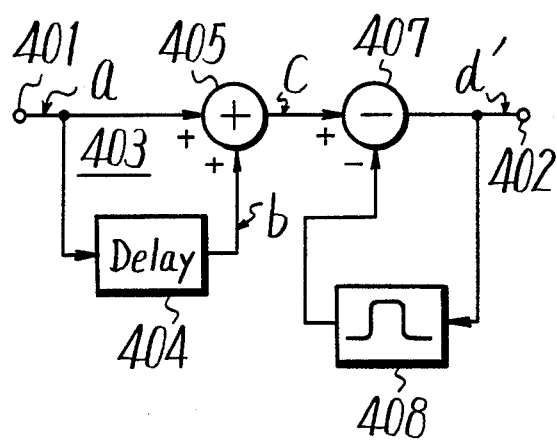
FIG. 7 is a block diagram of an embodiment of a luminance component processing circuit according to the present invention.

As a result, the frequency characteristic of the entire processing circuit of FIG. 7 has a flat frequency characteristic for the entire band of the luminance signal.

The transfer function of the embodiment of FIG. 7, i.e., from the input terminal 401 to the output 402, with respect to the frequency band of the luminance signal $S_y$, can be expressed as follows if the band-pass frequency characteristics of the delay line 404 and the filter 408 are expressed as $G(\omega)$ and $G'(\omega)$, respectively:

$$\frac{1 + G(\omega)}{1 + G'(\omega)}$$

Accordingly, if the transfer functions $G(\omega)$ and $G'(\omega)$ are substantially equal, the above transfer function approaches unity. Also, in the embodiment of FIG. 7, a single element can be used as both combining circuits 405 and 407.

With this embodiment of the invention, as described hereinabove, the inherent hump or bulge in the frequency characteristic of the comb filter 403, which occurs because of the band pass characteristic of the delay line 404, is compensated to present an overall flat frequency characteristic. As a result, the possibility of undesired distortion and ringing is diminished.

Figure 8:
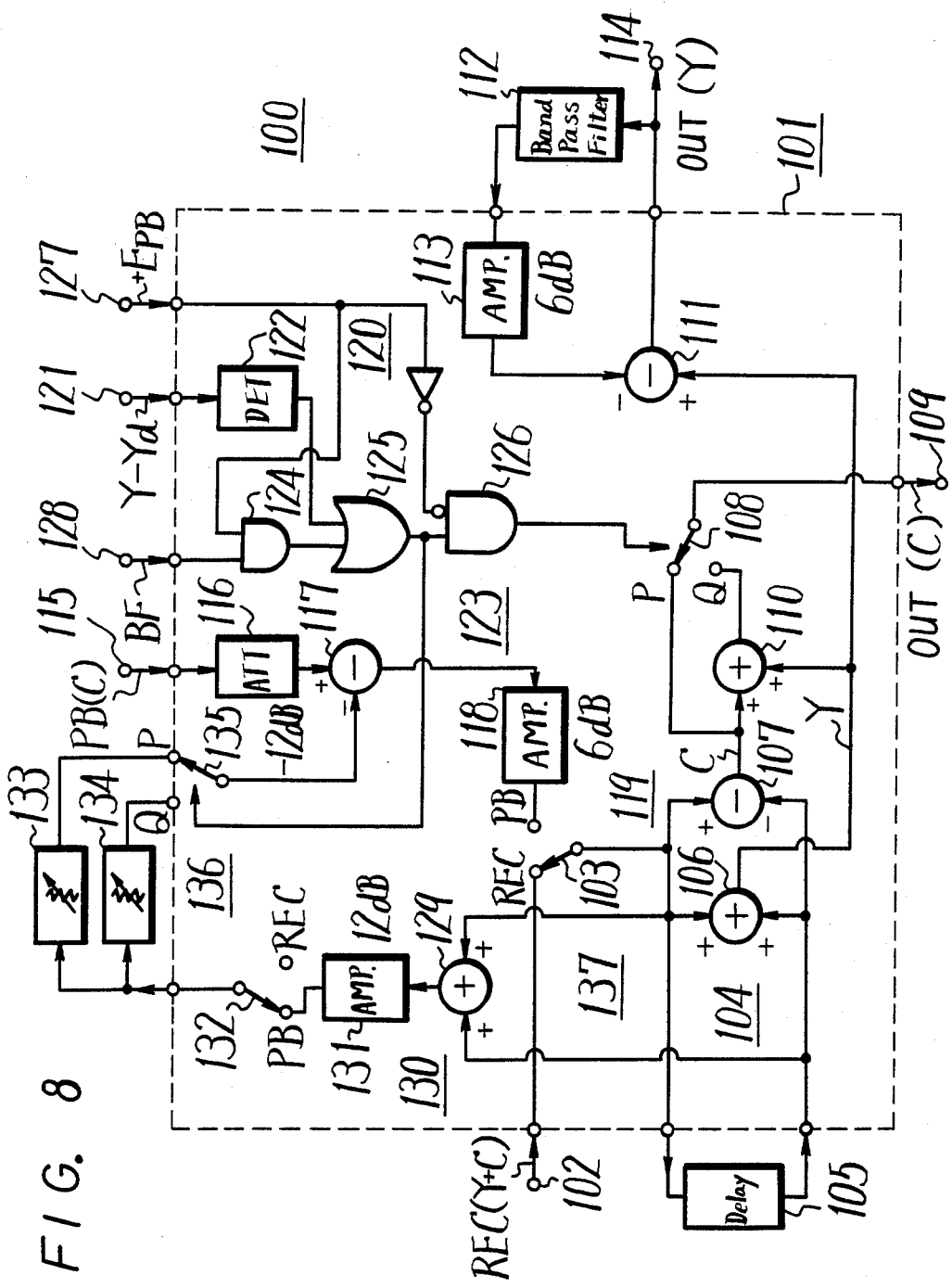
FIGS. 8 and 9 are block diagrams which together show another embodiment of the video signal processing circuit according to the present invention.
Figure 9:
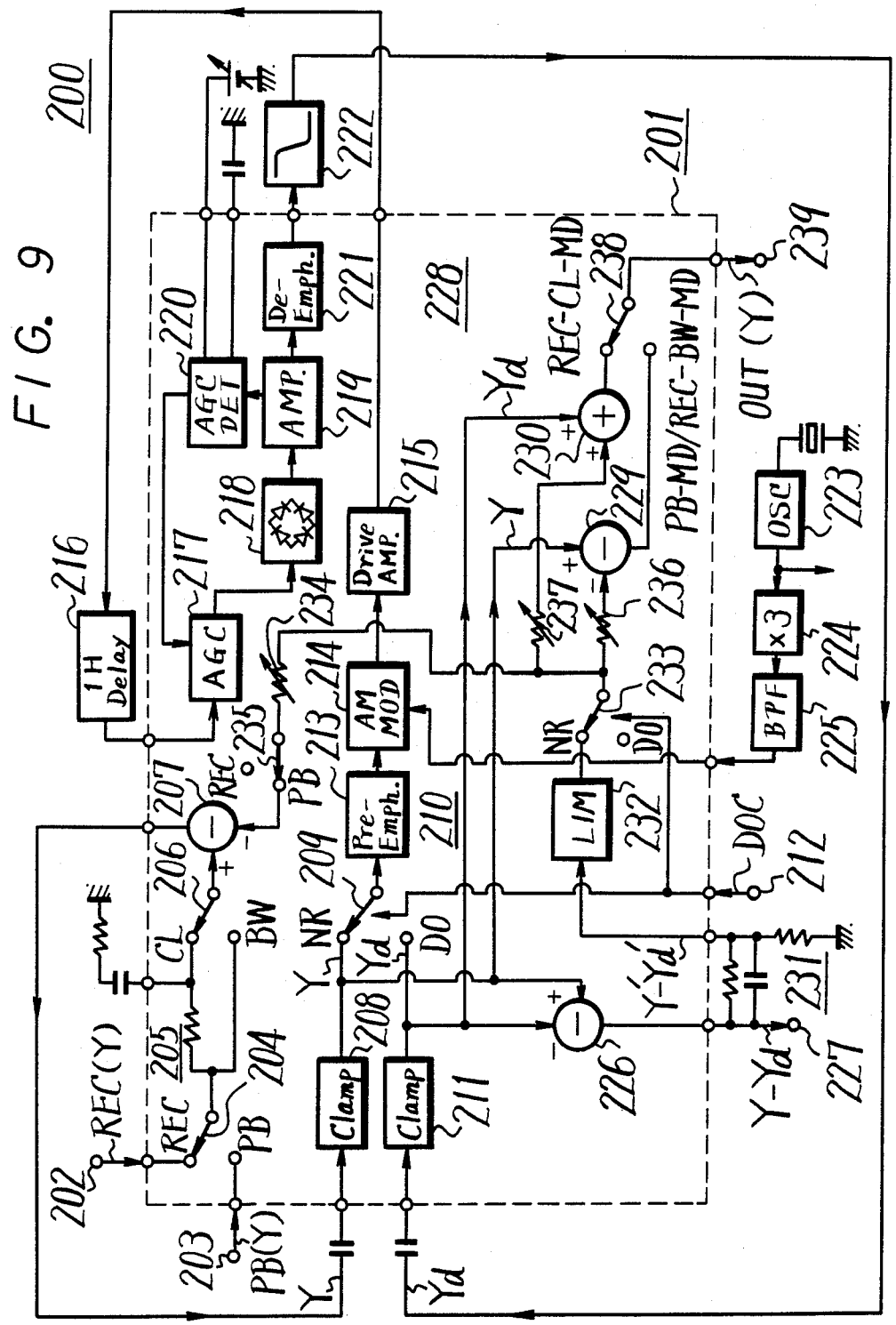

A detailed practical embodiment of the color video signal processing circuit according to this invention is shown generally as circuits 100 and 200 in FIG. 8 and FIG. 9, respectively. Here each of the circuits 100 and 200, respectively includes an IC chip 101 and 201, as well as various external elements.

In the circuit 100, a composite color video signal REC(Y+C), to be recorded, is applied to an input terminal 102 and is fed therefrom, through a recording contact REC of a recording and reproducing change-over switch 103, to a Y/C-type comb filter 104. In this comb filter 104 the composite color video signal is separated into its luminance component signal Y and its chrominance component signal C. The filter 104 includes a 1H delay line 105, a composer or adder 106, and another composer or subtracter 107.

During recording, the chrominance component signal C from the subtracter 107 is provided through one contact P of a change-over switch 108 to an output terminal 109 to serve as an output color signal OUT(C). Output signals from the composers 106 and 107 are each supplied to another composer or adder 110 where they are added together. The output from the adder 110 is provided to another contact Q of the change-over switch 108. The outputs from the composers 107 and 110 are alternatively selected by the change-over switch 108, which thereby acts as a selecting circuit.

The amplitude of the chrominance component output signal C from the subtracter 107 is twice as high when there is vertical correlation as the input chrominance component signal applied to the comb filter 104. However, if there is no vertical correlation, this relationship does not hold; thus, color misprint and color blur in the reproduced color picture occur at those times.

Therefore, when there is no vertical correlation, the input chrominance component signal is doubled in amplitude by an operational circuit 119 formed of the composers 106, 107, and 110, and is selected from the composer 110 by the change-over switch 108.

In the circuit 100 of FIG. 8, there is also provided a detecting circuit 120 for detecting vertical correlation of the luminance signal Y which is separated from the composite color video signal, and the output from the detecting circuit 120 is used to control the change-over switch 108. That is, the change-over switch 108 selects the first chrominance component signal (i.e., the output from the subtracter 107) when vertical correlation exists in the luminance signal, but selects the second output chrominance component signal (i.e., the output from the adder 110) when the vertical correlation in the luminance signal is lacking.

A portion of the detecting circuit 120 is included in the circuit 200 of FIG. 9, and that portion will be described later.

In the circuit 100, a difference signal $Y-Y_d$, representing the difference between the luminance signal Y and 1H-delayed version thereof $Y_d$ is applied through an input terminal 121 to a detector 122. When the absolute value of the level of the difference signal $Y-Y_d$ is lower than a predetermined reference level, it is presumed that vertical correlation is present in the chrominance component signal, but if the absolute value exceeds this reference level, the chrominance component signal is presumed to have no vertical correlation. The output from the detector 122 is fed to the change-over switch 108 through a logic circuit 123.

The combination of the operational circuit 119, the selecting circuit 108, and the detecting circuit 120 with the comb filter 104 substantially eliminates color misprint and color blur in the reproduced color picture, and hence the reproduced color picture is improved in quality.

Now, the logic circuit 123 will be explained. During only the playback or reproducing mode, a control voltage $+E_{PB}$ is applied through an input terminal 127 directly to an AND circuit 124 and through an inverter to another AND circuit 126. A burst flag signal BF is applied through an input terminal 128 to the AND circuit 124. The outputs from the detector 122 and the AND circuit 124 are applied through an OR circuit 125 to the AND circuit 126 whose output is applied to the change-over switch 108 as the control signal. Consequently, the change-over switch 108 is switched over to its contact P during the playback or reproducing mode, but alternates between the contacts P and Q during the recording mode as described above. Further, even during the recording mode, whenever a burst signal arrives, the change-over switch 108 is changed over to its contact P by the burst flag signal BF. This avoids any undesired shifting in the phase of the burst signal.

In the recording mode, the luminance signal Y from the adder 106 is fed to a composer or subtracter 111 whose output is fed back thereto through a band-pass filter 112 and an amplifier 113 to be subtracted from the luminance signal Y. An output luminance signal OUT(Y) is derived from the output of the subtracter 111 and is delivered to an output terminal 114. The pass-band frequency characteristic of the band-pass filter 112 is selected substantially to correspond to that of the delay line 105 of the comb filter 104.

The combination of the composer 111 and the band-pass filter 112 with the comb filter 104 compensates for the band-pass frequency characteristic of the comb filter 104, especially that of its delay line 105, so that the transmission system for the luminance signal Y has a substantially flat overall frequency characteristic (such as that of FIG. 5D'). Thus, the composer 111 and the filter 112 serve to prevent distortion and ringing in the transmission system from being generated.

A reproduced chrominance component signal PB(C), which is separated from a composite color video signal reproduced by the VTR, is applied from an input terminal 115 through an attenuator 116 to a composer or subtracter 117. The chrominance component signal PB(C) is applied therefrom to an amplifier 118. The latter provides the chrominance component signal to the Y/C-type comb filter 104 through a playback contact PB of the change-over switch 103.

Furthermore, upon playback or reproduction, a feedback signal is applied to the C-type comb filter 104. That is, the input chrominance component is applied to the C-type comb filter 104 and the same signal delayed by 1H through the delay line 105 are both applied to a composer or adder 129. This adder 129 constitutes an operational circuit 130 which produces a difference signal representing the vertical correlation of the input chrominance component signal in successive horizontal line intervals.

This difference signal is furnished from the operational circuit 130 through an amplifier 131 and a playback contact PB of a recording and reproducing change-over switching circuit 132 to respective inputs of first and second variable gain circuits 133 and 134. These circuits 133 and 134 can each include an amplifier or attenuator, and can also each include a variable phase shifter. The outputs from these circuits are respectively connected to alternate contacts P and Q of a change-over switching circuit 135, which has a change-over output connected to a subtracting input of the subtracter 117. The output provided from the switching circuit 135 is subtracted therein from the output of the attenuator 116. Thus, a feedback circuit 136 is formed from the elements 131 to 135 extending from the output of the composer 129 to the input of the composer 117. The output from the OR circuit 125, that is, the detecting signal provided from the detector 122 in the detecting circuit 120, controls the change-over switching circuit 135.

The strength of the feedback signal passing through the feedback circuit 136 is large when the change-over switching circuit 135 is switched to the contact P (corresponding to the first variable gain circuit 133), but is small when the switching circuit 135 is switched to the contact Q (corresponding to the second variable gain circuit 134).

When the absolute value of the level of the luminance difference signal $Y-Y_d$ is sensed by the detector 122 to be lower than the reference level, vertical correlation is regarded to be present in the chrominance component signal, and the change-over switch 135 is changed over to connect to the first variable gain circuit 133. The strength of the feedback signal is thereby increased. However, when the absolute value of the level of the difference signal $Y-Y_d$ exceeds the reference level, vertical correlation in the chrominance component signal is regarded as being absent, and the change-over switch 135 is changed to connect the second variable gain circuit 134 to reduce the strength of the feedback signal.

Upon the arrival of the burst signal (i.e., at the time of the burst flag signal BF), the change-over switch 135 is switched over to connect the second variable gain circuit 134.

The operational circuit 130 and the feedback circuit 136 are combined with the C-type comb filter 104 to form a C-feedback-type comb filter 137. The frequency characteristic of this filter 137 is a well-known serrated curve in which nodes, or troughs occur at the frequencies of $(n-1)f_h$, $nf_h$, $(n+1)f_h$, . . . (where n is a positive whole number and $f_h$ is the horizontal line frequency), and peaks occur the frequencies of $(n-\frac{1}{2})f_h$, $(n+\frac{1}{2})f_h$, . . . Further, as the attenuation factor of the feedback circuit 136 decreases, the peaks of the characteristic curve become sharp, but the troughs thereof become dull. On the other hand, as the attenuation factor thereof rises, the peaks of the characteristic curve become dulled, but the troughs thereof become sharp.

Accordingly, with the above-mentioned C-feedback-type comb filter 137, the signal-to-noise ratio, or SNR of the reproduced chrominance component signal PB(C) is greatly improved, while color misprint and color blur in the reproduced color image at contours thereof are substantially reduced. In addition, any chrominance cross-talk component, which will appear when there is no vertical correlation in the luminance signal (nor in the chrominance component signal), is also suppressed.

Details of the circuit 200 are shown in FIG. 9. Here, a luminance signal to be recorded REC(Y) separated from the composite color video signal to be recorded, and a played back luminance signal PB(Y) separated from the reproduced composite color video signal, are respectively applied to input terminals 202 and 203. The latter are respectively connected to record and playback contacts REC and PB of a recording/reproducing change-over switch 204. The output of this switch 204 is connected through a trap circuit 205, which is tuned to trap components at 3.58 MHz, to a color contact CL of a color/black-and-white change-over switch 206, and is also connected directly to a black-and-white contact BW of the switch 206. The output from the switch 206 is applied to a composer, or subtractor 207 to which is also provided another signal, to be described later, only during the reproducing mode.

The luminance signal Y is provided from the subtracter 207 and is furnished, through a clamp circuit 208, to a normal contact NR of a normal/dropout change-over switch 209, and thence is applied to a 1H delay circuit 210. The latter provides a delayed luminance signal $Y_d$, which is fed through a clamp circuit 211 to a dropout contact DO of the normal/dropout change-over switch 209. This switch 209 is controlled by a dropout control signal DOC applied thereto through an input terminal 212.

The 1H delay circuit 210 is constructed as follows. Between the output terminal of the change-over switch 209 and the input terminal of the clamp circuit 211, there are sequentially connected, in cascade, a pre-emphasis circuit 213, an AM modulator 214, a drive circuit 215, a 1H delay line 216 (comprised of an externally-connected glass delay line), an automatic gain control circuit 217, an AM detector 218, an amplifier 219 whose output is in part applied to an AGC detecting circuit 220 associated with the automatic gain control circuit 217, a de-emphasis circuit 221, and an externally-connected low-pass filter 222. The AM detector 218 can be a full wave rectifier.

The AM modulator 214 is supplied, for example, with a carrier signal of 10.74 MHz, i.e., $3f_c$ or three times the chrominance subcarrier frequency of 3.58 MHz. A quartz reference oscillator 223 provides an oscillation reference signal. This oscillator can also form a part of an APC (automatic phase control) circuit used in a low frequency conversion and reverse conversion of the chrominance component signal during recording and reproducing operations of the VTR. The oscillation reference signal is fed to a frequency trebler circuit 224, and the output from the latter is applied to a band pass filter 225 from which the above-mentioned carrier signal of 10.74 MHz is obtained. The factor for multiplying the color sub-carrier frequency need not be limited to three, but can be selected to be any desired multiple. If the oscillator 223 is common to several functions, as set forth above, mutual interference that can occur when plural independent oscillators are provided can be avoided.

In this case, even though the 1H glass delay line 216 has a band pass filter characteristic, the delay circuit 210, as a whole, has a wide band characteristic for the luminance signal, and distortion in the luminance signal is avoided. Further, the component of 21.48 MHz (i.e., 10.74 MHz×2), which is generated at the AM detector 218, can be positively removed by the de-emphasis circuit 221 and the low pass filter 222 in combination.

The luminance signal Y and the delayed luminance signal $Y_d$ from the clamp circuits 208 and 211 are fed to respective inputs of a composer or subtracter 226, wherein the latter signal $Y_d$ is subtracted from the former signal Y to provide a difference signal $Y-Y_d$, and this difference signal $Y-Y_d$ appears at an output terminal 227. This difference signal $Y-Y_d$ thus provided is supplied to the input terminal 121 of the circuit 100 of FIG. 8.

A luminance signal processing circuit 228 processes the luminance signal Y and the delayed luminance signal $Y_d$ from the clamp circuits 208 and 211. These signals Y and $Y_d$ are respectively supplied to a composer or subtracter 229 and a composer or adder 230, and the difference signal $Y-Y_d$ from the subtracter 226 is applied through an attenuator 231 as an attenuated difference signal $Y'-Y_d'$ to a limiter circuit 232. The latter operates such that when the absolute value of the level of the attenuated difference signal $Y'-Y_d'$ is less than a predetermined reference level, i.e., if vertical correlation exists in the luminance signal Y, the difference signal $Y'-Y_d'$ (which could be considered as a noise component) is provided from the limiter circuit 232, as-is. However, when the absolute value of the level of the difference signal $Y'-Y_d'$ exceeds the predetermined reference level, i.e., if the luminance signal Y has no vertical correlation, the limiter circuit 232 delivers a zero output signal.

The output from the limiter circuit 232 is delivered through a normal contact NR of a normal/dropout change-over switch 233 (which is turned ON and OFF by the dropout control signal DOC). The output of the change-over switch 233 is supplied to the subtracter 207 through a variable attenuator 234 and a recording and reproducing change-over switch 235 (which is turned ON during reproduction and OFF during recording) to be subtracted from the reproduced luminance signal PB(Y).

Further, the output from the normal/dropout change-over switch 233 is applied through respective variable attenuators 236 and 237 to inputs of the composers 229 and 230, where the attenuated signal is subtracted from the luminance signal Y and added to the delayed luminance signal $Y_d$. The output signals of the composers 229 and 230 are selectively coupled by another change-over switch 238 to an output terminal 239 as an output luminance signal OUT(Y). The change-over switch 238 is arranged so that it selects the output signal from the composer 229 in the playback mode and when recording black and white signals, but so that it selects the output signal from the composer 230 when recording color signals.

Incidentally, if the attenuation factors (i.e., transfer functions) of the attenuators 231, 234, 236, and 237 are respectively $k_0$, $k_1$, $k_2$ and $k_3$, and the transfer function of the limiter 232 is selected as L (i.e., 0 or 1), the output luminance signal OUT(Y) in the color recording mode can be expressed as follows:

$$OUT(Y) = Y_d + k_0 k_3 L (Y - Y_d)$$

where Y = REC(Y).

On the other hand, the output luminance signal OUT(Y) in the black-and-white recording mode can be expressed as follows:

$$OUT(Y) = Y - k_0 k_2 L (Y - Y_d)$$

where Y = REC(Y).

Further, the transfer function OUT(Y)/PB(Y) during the reproducing mode can be expressed as follows:

$$\frac{OUT(Y)}{PB(Y)} = \frac{1 - k_0 k_2 L (1 - e^{-\tau s})}{1 + k_0 k_1 L (1 - e^{-\tau s})}$$

where the transfer function of the 1H delay line 105 is $e^{-\tau s}$.

From the foregoing it will be understood that when the luminance signal processing circuit 228 of this invention is used, any noise component in the luminance component signal to be recorded can be removed therefrom, and also any noise component and any cross-talk component in the reproduced luminance component signal (which, for example, can be caused by high density recording of the video signal on magnetic tape by a VTR) can be removed.

While certain preferred embodiments have been described in detail hereinabove, many modifications and variations thereof will become apparent to those of ordinary skill in the art without departure from the scope and spirit of this invention, which are defined in the appended claims.

What is claimed is:

1. A color video signal processing circuit for processing a composite color video signal containing a luminance component and a chrominance component, the composite color video signal being formatted as a sequence of horizontal line intervals, each having a predetermined horizontal line period and each containing video information to be presented in vertical alignment with corresponding video information in an adjacent line interval, comprising chrominance comb filter means to which an intermediate chrominance signal is applied for providing a filtered chrominance component in which undesired signal components have been suppressed; an operational circuit providing a difference signal representing vertical correlation of the chrominance component in vertically aligned portions of different horizontal line intervals; feedback loop circuit means for feeding back said difference signal and combining said chrominance component therewith to produce said intermediate chrominance signal, said feedback loop circuit means having variable non-zero feedback loop gains; detecting means for detecting correlation of video information in said luminance component in vertical aligned portions of different line intervals and providing a detecting signal in response to such detecting; and controlling means for adjusting said feedback loop gain to a respective non-zero value in accordance with said detecting signal.

2. A color video signal processing circuit according to claim 1; wherein said chrominance comb filter means includes a subtractive combining circuit having an input coupled to receive said intermediate chrominance component signal, another input, and an output providing said filtered chrominance component signal, and a delay line having a delay of one horizontal period with an input coupled to receive said intermediate chrominance component signal and an output coupled to the other input of said subtractive combining circuit.

3. A color video signal processing circuit according to claim 2; wherein said operational circuit includes an additive combining circuit having an input coupled to receive said intermediate chrominance component signal, another input coupled to the output of said delay line, and an output; said feedback loop includes first and second attenuators; and said controlling means includes switching means for selectively connecting one or the other of said attenuators between the output of said additive combining circuit and a point in advance of said chrominance comb filter means in response to said detecting signal.

4. A color video signal processing circuit according to claim 2; wherein said operational circuit includes an additive combining circuit having an input coupled to receive said intermediate chrominance component signal, another input coupled to the output of said delay line, and an output; and said feedback loop includes another subtractive combining circuit having an output coupled to said chrominance comb filter means, an input coupled to receive said input chrominance component signal, and another input; and variable attenuator means coupled between said additive combining circuit and the other input of said other subtractive combining circuit and having an attenuation factor that is variable in accordance with said detecting signal.

5. A color video signal processing circuit according to claim 1; wherein said detecting means includes a subtractive combining circuit having a first input coupled to receive said luminance component, a second input, and an output, a delay circuit having a delay of one horizontal line period and a transfer characteristic that is substantially flat for frequencies within said luminance component, with an input coupled to receive said luminance component and an output coupled to the other input of said subtractive combining circuit such that output of the latter provides a luminance difference signal, and a detector coupled to the output of said subtractive combining circuit to provide said detecting signal in response to said difference signal.

6. A color video signal processing circuit for processing a composite color video signal containing a luminance component and a chrominance component, the composite color video signal being formatted as a sequence of horizontal line intervals, each having a predetermined horizontal line period and each containing video information to be presented in vertical alignment with corresponding video information in an adjacent line interval, comprising chrominance comb filter means to which an intermediate chrominance signal is applied for providing a filtered chrominance component in which undesired signal components have been suppressed; an operation circuit providing a difference signal representing vertical correlation of the chrominance component in vertically aligned portions of different horizontal line intervals; feedback loop circuit means for feeding back said difference signal and combining said chrominance component therewith to produce said intermediate chrominance signal, said feedback loop circuit means having a variable feedback loop gain; detecting means for detecting correlation of video information in said luminance component in vertical aligned portions of different line intervals and providing a detecting signal in response to such detecting; controlling means for adjusting said feedback loop gain to a non-zero value in accordance with said detecting signal; a luminance comb filter to which said luminance component is applied and providing a filtered luminance component at an output thereof; a combining circuit having an input, and an output; and a filter circuit having an input and an output respectively coupled to the output and the other input of said combining circuit and having a transfer characteristic selected such that the output of said combining circuit has a flat frequency transfer characteristic with respect to said luminance component.

7. A color video signal processing circuit according to claim 6; wherein said luminance comb filter includes an additive combining circuit having an input coupled to receive said luminance component, another input and an output, and a glass delay line having a delay of one horizontal line period and a predetermined transfer characteristic, with an input coupled to receive said luminance component and an output coupled to the other input of said additive combining circuit, and wherein said filter circuit has its transfer characteristic selected to correspond to the predetermined transfer characteristic of said glass delay line.

8. A color video signal processing circuit according to claim 6; wherein said combining circuit is a subtractive combining circuit.

9. A color video signal processing circuit for processing a composite color video signal containing a luminance component and a chrominance component, the composite color video signal being formatted as a sequence of horizontal line intervals, each having a predetermined horizontal line period and each containing video information to be presented in vertical alignment with corresponding video information in an adjacent line interval, comprising chrominance comb filter means to which an intermediate chrominance signal is applied for providing a filtered chrominance component in which undesired signal components have been suppressed; an operational circuit providing a difference signal representing vertical correlation of the chrominance component in vertically aligned portions of different horizontal line intervals; feedback loop circuit means for feeding back said difference signal and combining said chrominance component therewith to produce said intermediate chrominance signal, said feedback loop circuit means having a variable feedback loop gain; detecting means for detecting correlation of video information in said luminance component in vertical aligned portions of different line intervals and providing a detecting signal in response to such detecting; and controlling means for adjusting said feedback loop gain to a non-zero value in accordance with said detecting signal; said detecting means including a subtractive combining circuit having a first input coupled to receive said luminance component, a second input, and an output, a delay circuit having a delay of one horizontal line period and a transfer characteristic that is substantially flat for frequencies within said luminance component, with an input coupled to receive said luminance component and an output coupled to the other input of said subtractive combining circuit such that output of the latter provides a luminance difference signal, and a detector coupled to the output of said subtractive combining circuit to provide said detecting signal in response to said luminance difference signal; and said delay circuit including an AM modulator for modulating said luminance component on a carrier providing a modulated signal, a dislay line delaying said modulated signal, and an AM detector following said delay line for demodulating the delayed modulated signal.

10. A color video signal processing circuit according to claim 9; wherein said delay circuit further includes a preemphasis circuit in advance of said AM modulator and a deemphasis circuit following said AM detector.

11. A color video signal processing circuit according to claim 10; wherein said delay circuit further includes an automatic gain control circuit disposed between said AM modulator and said deemphasis circuit.

12. A color video signal processing circuit according to claim 11; wherein said delay circuit further includes a low pass filter following said deemphasis circuit.

13. A color video signal processing circuit according to claim 10; wherein said delay circuit further includes a low pass filter following said AM demodulator.

14. A color video signal processing circuit according to claim 13; wherein the circuit elements constituting said delay circuit are all formed as an integrated circuit.

15. A color video signal processing circuit for processing a composite color video signal containing a luminance component and a chrominance component, the luminance and chrominance components being frequency-interleaved with one another, and the composite color video signal being formatted as a sequence of horizontal line-intervals, each having a predetermined horizontal line period and each containing video information to be presented in vertical alignment with corresponding video information in an adjacent line interval; comprising chrominance comb filter means having an input to receive an intermediate chrominance component signal and an output providing a filtered chrominance component signal substantially free of the interleaved luminance component; operational circuit means supplied with said input chrominance component signal providing a difference signal representing the vertical correlation of the input chrominance component signal in vertically aligned portions of different horizontal line intervals; a combining circuit for combining an input chrominance component signal with said difference signal to produce said intermediate chrominance component signal; detecting circuit means for detecting correlation of video information in the luminance component in vertically aligned portions of different horizontal line intervals and providing a detecting signal having one sense if there is substantial correlation in such video information, but having another sense otherwise; and attenuation means for feeding said difference signal back to said combining circuit with a first strength and with a second strength when said detecting signal has said one sense and said other sense, respectively.

16. A color video signal processing circuit according to claim 15; wherein said operational circuit means and said detecting circuit means each includes a delay circuit imparting a delay of the same number n of horizontal line periods, where n is a natural number.

17. A color video signal processing circuit according to claim 15; wherein said attenuation means includes first and second attenuators selectively providing said difference signal at said first and second strengths, with said second attenuator rendering a larger amount of attenuation than said first attenuator.

18. A color video signal processing circuit according to claim 15; wherein said detecting circuit means includes a subtracting circuit having one input connected to receive said luminance component, another input, and an output; a delay circuit having a flat transfer characteristic for all frequencies in the luminance component and having a delay time of n horizontal line periods, where n is a positive whole number, with an input connected to receive said luminance component and an output coupled to the other input of said subtracting circuit means; and comparator means having an input coupled to the output of said subtracting means and an output providing said detecting signal in response to a comparison of a luminance difference signal, appearing at the output of said subtracting means, with a reference level.

19. A color video signal processing circuit according to claim 18; wherein said delay circuit having a flat transfer characteristic includes an input receiving said luminance component, a preemphasis circuit imparting preemphasis to said luminance component, an amplitude modulator following said preemphasis circuit modulating a carrier with the preemphasized luminance component; a delay line following said modulator and imparting said n horizontal line periods of delay; an automatic gain control circuit following said delay line; a detector circuit following said automatic gain control circuit for detecting the luminance component carried on said carrier; a deemphasis circuit following said detector and imparting an amount of deemphasis complementary to said preemphasis; and a low pass filter following said deemphasis circuit and providing said luminance component delayed by said n horizontal line periods.

20. A color video signal processing circuit operable in a recording mode and in a reproducing mode for processing a composite color video signal containing a luminance component and a chrominance component, the luminance and chrominance components being frequency-interleaved with one another, and the composite color video signal being formatted as a sequence of horizontal line intervals, each having a predetermined horizontal line period and each containing video information to be presented in vertical alignment with corresponding video information in an adjacent line interval; said circuit comprising, in said reproducing mode, chrominance comb filter means having an input to receive an intermediate chrominance component signal and an output providing a filtered chrominance component signal substantially free of the interleaved luminance component; operational circuit means supplied with said intermediate chrominance component signal and providing a difference signal representing the vertical correlation of the input chrominance component signal in vertically aligned portions of different horizontal line intervals; a combining circuit for combining an input chrominance component signal with said difference signal to produce said intermediate chrominance component signal; detecting circuit means for detecting correlation of video information in the luminance component in vertically aligned portions of different horizontal line intervals and providing a detecting signal having one sense if there is substantial correlation in such video information, but having another sense otherwise; attenuation means for feeding said difference signal back to said combining circuit and having a degree of attenuation that depends upon the sense of said detecting signal; said circuit comprising, in said recording mode, said chrominance comb filter means having said input receiving said composite color video signal and said output providing said filtered chrominance component signal substantially free of said interleaved luminance component; luminance comb filter means supplied with said composite color video signal and including a delay line providing a delayed version of said luminance component delayed by n horizontal line periods, where n is a positive whole number, and combining means combining said luminance component and said delayed version thereof to provide a filtered luminance signal, said delay line having a particular transfer characteristic; a combining circuit having one input coupled to receive said filtered luminance component, another input, and an output; and a filter circuit having an input and an output connected respectively to said output and said other input of said combining circuit and having a transfer characteristic corresponding to that of said delay line.

21. A color video signal processing circuit according to claim 20; wherein said filter circuit is a band pass filter.

22. A color video signal processing circuit according to claim 21; wherein said chrominance component is modulated on a color subcarrier having a color subcarrier frequency, and said band pass filter has a transfer characteristic substantially centered on said color subcarrier frequency.

* * * * *